Dec. 12, 1933.　　　L. H. BENSTER ET AL　　　1,938,795
ROTARY VALVE FOR ENGINES
Filed Oct. 4, 1929　　　2 Sheets-Sheet 1

INVENTORS
Lucien Halsey Benster
BY Rolland S. Trott

Rolland S. Trott
ATTORNEY.

Dec. 12, 1933.   L. H. BENSTER ET AL   1,938,795
ROTARY VALVE FOR ENGINES
Filed Oct. 4, 1929   2 Sheets-Sheet 2

INVENTORS.
Lucien Halsey Benster
Rolland S. Trott
BY
Rolland S. Trott
ATTORNEY.

Patented Dec. 12, 1933

1,938,795

UNITED STATES PATENT OFFICE 1,938,795

ROTARY VALVE FOR ENGINES

Lucien Halsey Benster and Rolland S. Trott, Denver, Colo.

Application October 4, 1929. Serial No. 397,251

37 Claims. (Cl. 123—190)

Our invention relates to rotary valves for engines, more especially for internal combustion engines.

The object of our invention is to provide a rotary valve to rotate in a ported housing and which will not only perform all the functions required of a valve, but in which all the ports of both the valve and the housing are sealed by resiliently held members at all times, so that the valve may be completely immersed in oil without undue loss of oil through any of the said ports.

A further object of our invention is to provide resiliently held contacts for the transverse faces of the valve and anti-friction positioning means so that the ends and walls of the valve may have ample clearance with its housing and extreme precision in the fit of the valve in its housing will not be required.

We attain the above objects by packing both transverse faces of a rotary valve with resiliently held packing plates and connecting the valve ports of the transverse faces to the housing ports by resilient apertured sealing members, and by providing an anti-friction bearing to position the rotary valve in its housing and by providing means to drive the rotary valve.

All of this is described more in detail below and is illustrated in the drawings, in which:—

Figure 1:
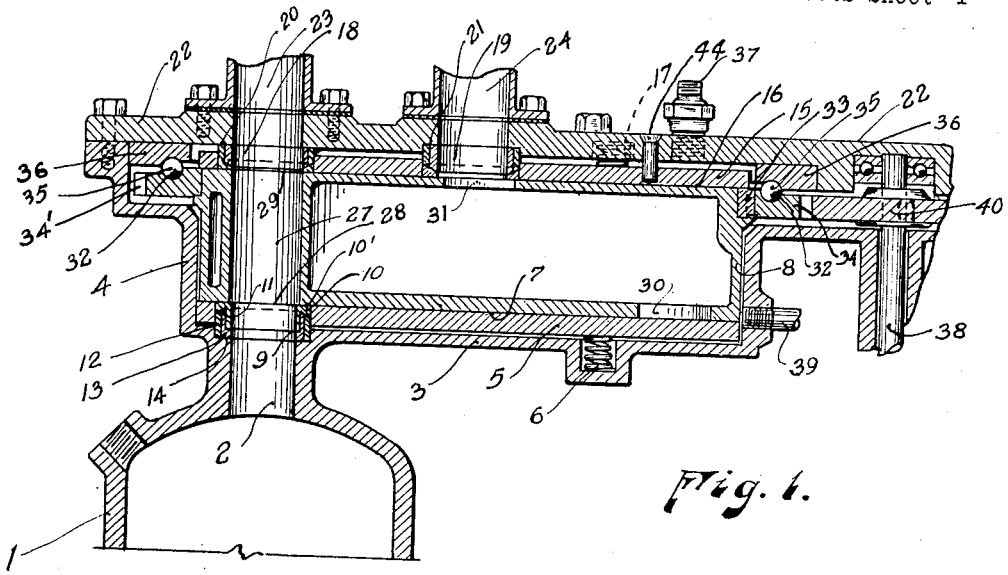
Figure 1 is a fragmentary sectional view through one form of construction of our invention showing the rotary valve, hereinafter called the rotary, the valve, or the rotary valve, and its working cylinder.

The cylinder 1 is provided with the port 2 through the end wall 3 of the rotary housing 4.

The packing plate 5 is resiliently held by the three spaced springs 6 against the lower transverse face 7 of the rotary 8; any other proper construction, design or number of springs may be used so long as the result is a resilient contact between the plate 5 and the face 7.

The plate 5 is provided with an aperture through which extends the cylinder sealing means 9.

This aperture may be entirely surrounded by the material of the plate, or may extend to its outer rim forming an open sided aperture in the plate, so long as the sealing means 9 may extend therethrough and contact with the face 7 of the rotary 8.

The plate is preferably made of graphite, of graphite inlaid in other material, of graphite backed up by other material, or it may be made of some other material having inherent lubricating qualities, but it may if desired be made of metal, wood or fabricated material, so long as in any case the plate is of substantially the same diameter as the co-acting transverse rotary face, whereby it may completely cover its ports.

The cylinder sealing means 9 may be composed of the solid ring 10 whose plane upper face 10' bears against the face 7 of the rotary 8 and which is provided with a lower face 11 against which bears the two staggered, split rings 12 and 13. See Figures 8 and 9.

Figure 8:
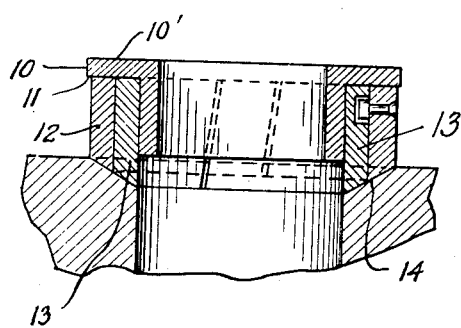
Figure 8 is a view of one form of sealing means.
Figure 9:
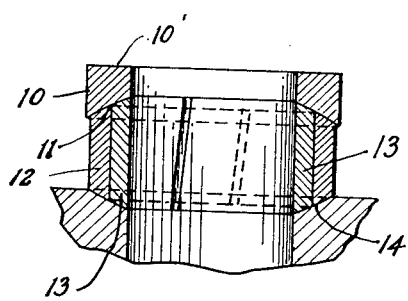
Figure 9 is a view of a modified form of sealing means.

The lower face 11 of the ring 10 may be plane as in Figure 8, beveled as in Figure 1, or spherical as in Figure 9, but in any case the upper faces of the split rings 12 and 13, or of any other form of co-acting part should conform therewith and be ground to a perfect seat thereon.

The two rings 12 and 13 seat against a face 14 surrounding the port 2, and the spring of their material results in an axial pressure upon the ring 10 forcing it into resilient contact with the transverse face 7 of the rotary 8.

The face 14 may be flat as shown in Figure 1, beveled as shown in Figure 8, or spherical as shown in Figure 9, but in any case the co-acting face or faces of the sealing means should conform therewith and be ground to a perfect seat thereon.

Any other proper sealing means may be employed so long as it is in substantially leak-proof communication with the co-acting housing port and in resilient contact with the adjacent transverse face of the rotary valve.

The upper packing plate 15 is resiliently held against the upper face 16 of the rotary valve 8 by the three spaced springs 17, or by any other proper spring-held construction, and is provided with two apertures through which extend the exhaust sealing means 18 and the intake sealing means 19, both of which are similar in construction and are subject to the same variations as suggested above for the cylinder sealing means 9, and they bear against seats 20 and 21 respectively in the rotary housing cover 22, surrounding the exhaust and intake passages 23 and 24 respectively.

The packing plate 15 is preferably made of graphite but may be made of any proper alternative material, construction or combination such as suggested above in regard to the plate 5.

The seats 20 and 21 may be flat as shown in Figure 1, beveled as shown in Figure 8, or spherical as shown in Figure 9, but in any case the co-acting face or faces of the sealing means should conform therewith and should be ground to a perfect seat thereon.

Any other proper sealing means may be employed so long as they are in substantially leak-proof communication with their co-acting housing ports and are in resilient contact with the adjacent transverse face of the rotary valve.

The rotary valve 8 is provided with the exhaust passage 27 which terminates in the ports 28 and 29 in the faces 7 and 16 respectively.

The intake port 30 in the face 7 registers with the sealing means 9, and the intake port 31 in the face 16 registers with the sealing means 19.

The driving race 32 is drivably attached to the rotary 8 by some proper means such as the key 33, and is provided with the driving gear teeth 34', and acts as a track for the balls 35, which with the upper track 36 position the rotary 8 in the housing 4.

Oil is fed under pressure to the housing in any proper manner such as the oil feed connection 37, and oil is drained from the housing in any proper manner such as down along the pinion shaft 38 or through the connection 39, or both along the shaft 38 and through the connection 39.

The pinion 40, properly attached to the shaft 38 meshes with and drives the driving gear 34. If the engine is to operate upon the four stroke cycle, the speed of the shaft 38 should combine with the ratio of the gears 40 and 34 to rotate the valve 8 once in every two revolutions of the engine crankshaft.

The cylinder 1, though shown integral with the housing 4, may have the housing attached in the usual detachable cylinder head manner if desired, and in any case, though no cooling construction is shown in the drawings, either air or water, or a combination of the two methods may be employed, the same as with any other form of valve construction, and as anyone versed in such matters will understand.

It will now be seen that the two off-center rotary valve ports in the face 7 are always sealed by the combination of the plate 5 and the sealing means 9. The plate 5 seals against oil entering the ports of the face 7, and the sealing means 9 not only seals against oil entering but against pressure leaking between the means 9 and the face 7 and between the means 9 and the end wall 3.

And the ports in the transverse face 16 of the rotary valve are always sealed by the combination of the plate 15 and the sealing means 18 and 19. The plate 15 seals against oil entering the ports and the sealing means 18 and 19 seal not only against oil entering but against pressure leaking between said means 18 and 19 and the face 16 and between said means 18 and 19 and the rotary housing cover 22.

Therefore, oil under a medium pressure may be employed in the housing 4 without the danger of excessive oil loss either into the cylinder or into the rotary or into the intake or exhaust passages of the housing, and without the danger of leakage of charge or gas from the means 9 or the port 2 into the space between the face 7 and the wall 3, or from the means 18 and 19 and the passages 23 and 24 into the space between the face 16 and the cover 22.

Since there are no ports in the outer face of the rotary, and since the anti-friction bearing positions the rotary valve in its housing, it is not necessary for the valve to have contact with the walls of the housing. The upward resilient pressure of the means 6, the springs 6 and the resulting contact of the plate 5 tends to position the rotary by holding it constantly against the ball bearing.

The ports in the face 16 of the rotary are not at the same radius, so each one registers only with its own co-acting passage in the cover 22. As shown, the intake passage 24 is just enough off-center to insure the proper lubrication of the sealing means 19.

Figure 4:
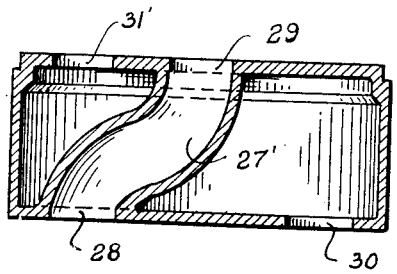
Figure 4 is a detail of one form of our rotary valve.
Figure 5:
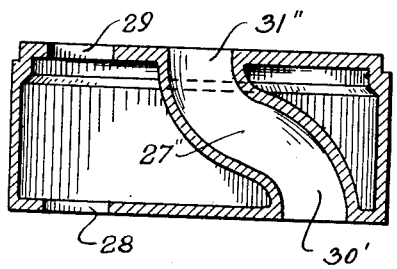
Figure 5 is a detail of another form of our rotary valve.

It is evident that the exhaust passage in the rotary could be made to connect with the nearly central port in the face 16 as shown in Figure 4, or the intake ports of the two faces of the rotary could be connected by a passage and the exhaust allowed to fill the entire inside of the rotary as shown in Figure 5.

But, in any case, the main feature would be the same in that two ports at substantially the same radius in the rotary face adjacent the cylinder are connected through the rotary with two out of line ports in the remote face of the rotary, both faces being independently completely sealed by plates and sealing means combined.

Figure 2:
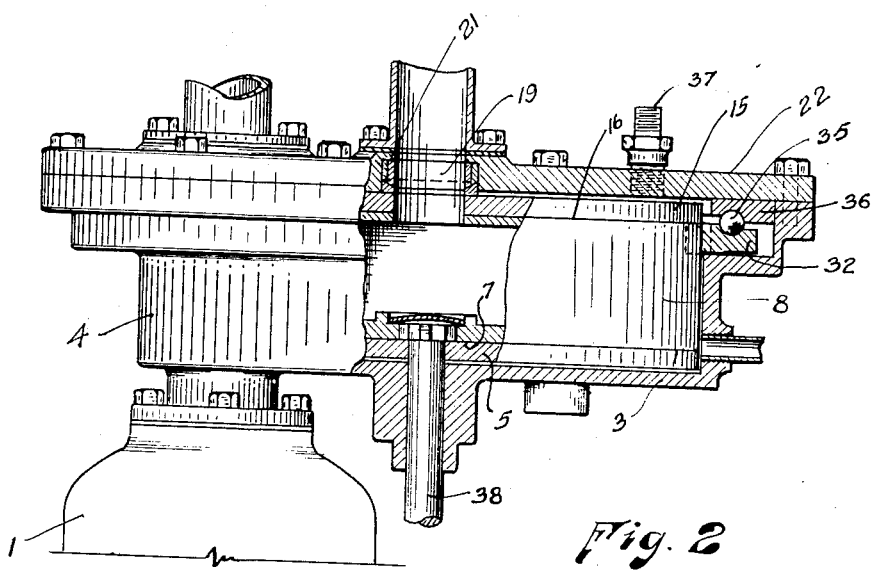
Figure 2 shows a modified form of our rotary valve.

In Figure 2, the driving gears are dispensed with, and the rotary is off-set from the cylinder so that the splined end of the drive shaft 38' may fit directly into a splined hole in the lower face of the rotary.

Figure 3:
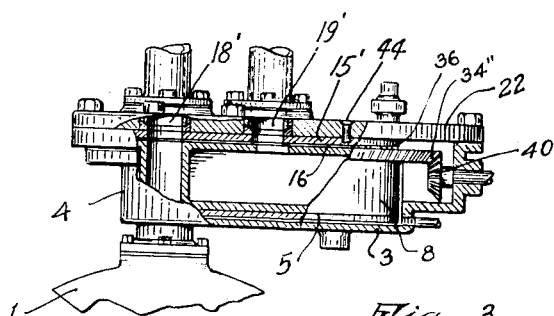
Figure 3 shows another modified form of our rotary valve.

In Figure 3 the gear 34" is of the bevel type and is driven by the bevel pinion 40', and the sealing means 18' and 19' bear against the upper face of the packing plate 15', instead of against the face 16 of the rotary. Either sealing means, however, may, if desired extend through the plate and bearing directly against the face 16. The plate 15' is held from revolving by the pin 44.

Figure 6:
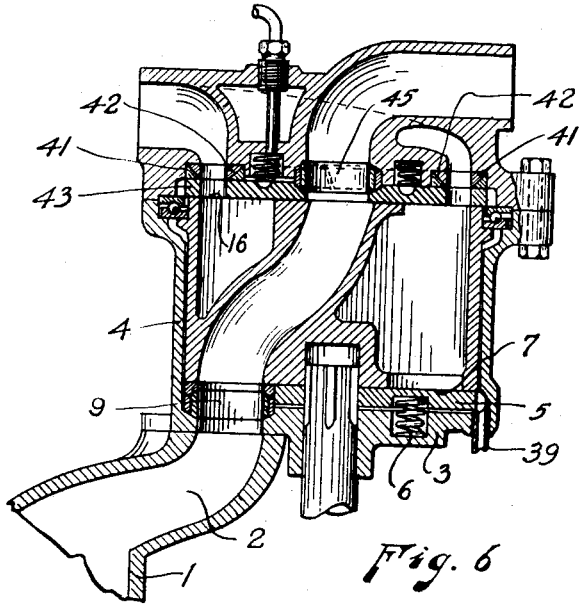
Figure 6 is a section showing the assembly of another form of construction.
Figure 7:
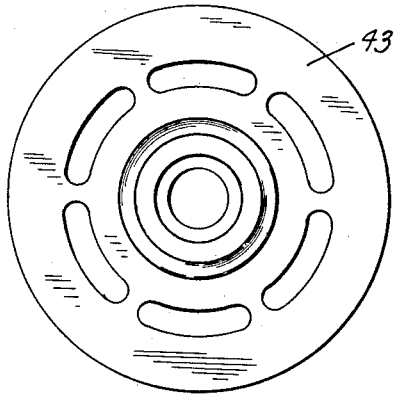
Figure 7 is a plan view of the top packing plate of the rotary valve shown in Figure 6.

In Figure 6 the intake port in the face 16 of the rotary is circular, and is sealed by the two sealing means 41 and 42, bearing against the plate 43; the exhaust port is located within the intake port and is sealed by the sealing means 45 bearing against the plate 43.

It is obvious that in this construction the outer circular port may just as well be employed as the exhaust port, by the proper positioning and proportions of parts.

This valve of ours may be combined with a cylinder in either of the construction shown in Figures 1 and 2, and any form of the valve may be positioned at any other desired angle or position with regard to the cylinder so long as it is properly connected thereto and properly driven and lubricated.

It is also obvious that though we have shown and described our completely sealed rotary valve as adapted to a four stroke cycle internal combustion engine, it may just as well be constructed to act as a controlling valve with any other combination of valve ports and of housing ports to serve any other type or form of engine or other device, since the essence of the invention is not in any particular combination, number or position of ports but resides broadly in the combined packing plate and sealing means together for controlling and sealing not only all ports in both transverse faces of the rotary valve but also in sealing the connection between all ports in both faces of the rotary valve and the co-acting ports in the rotary valve housing.

Therefore, we do not wish to narrowly limit our protection to the exact forms and constructions shown and described, but what we claim as new and desire to protect by Letters Patent, is as follows:—

1. A rotary valve having ported transverse faces and adapted to rotate in a housing having ports co-acting with the ports of said faces, sealing means substantially equal in diameter to said faces resiliently bearing against each transverse face and in communication with the co-acting housing ports, and thrust means separate from said sealing means opposing axial movement of the valve in the housing.

2. A rotary valve adapted to revolve in a ported housing and having two transverse ported packing faces co-operating with two end walls of the said housing, a ported housing, resiliently held non-revolvable packing plates bearing against the transverse faces of the valve, and ported means having resilient contacts with said transverse faces of the valve, and connecting the valve ports to the co-acting housing ports for predetermined timed intervals upon each revolution of the valve, and contact means forming the only solid contact between the valve and the housing to position the valve therein.

3. A rotary valve adapted to revolve in a ported housing and having two transverse ported faces co-operating with two ported end walls of the said housing, a ported housing, resiliently held non-revolvable packing plates, bearing against the transverse faces of the valve, and resilient circular sealing members connecting the valve ports in communication with the housing ports for predetermined timed intervals upon each revolution of the valve, and contact means forming a contact between the valve and the housing to position the valve in the housing.

4. A rotary valve adapted to revolve in a ported housing and having two transverse ported packing faces co-operating with two ported end walls of the said housing, a ported housing, resiliently held non-revolvable packing means bearing against the transverse faces of the valve, and ported means having resilient contacts with said transverse faces of the valve, and connecting each valve port with its co-acting housing port for a predetermined timed interval during each revolution of the valve, and contact means to position the valve in the housing.

5. A rotary valve adapted to revolve in a ported housing and having two transverse ported packing faces co-operating with two ported end walls of the said housing, a ported housing, and separate ported means of substantially the same diameter as and having resilient contact with each transverse face of the valve and including a circular apertured sealing member registering with and in substantially leakproof connection with each housing port and connecting with the co-acting valve ports for a predetermined timed interval during each revolution of the valve, and contact means positioning the valve in the housing.

6. A rotary valve adapted to revolve in a ported housing and having two transverse ported packing faces co-operating with two ported means of substantially the same diameter as and having resilient contacts with said transverse faces of the valve and connecting the valve ports to the co-acting adjacent housing ports for predetermined timed intervals during each revolution of the valve, and means positioning the valve in the housing.

7. A rotary valve adapted to revolve in a ported housing and having two transverse ported packing faces co-operating with two ported end walls of the said housing, a ported housing, and separate ported means of substantially the same diameter as and having resilient contact with each transverse face of the valve and positioned between each face and the adjacent end wall of the housing and connecting each valve port with its co-acting housing port for a predetermined timed interval during each revolution of the valve, and contact means positioning the valve in the housing.

8. A rotary valve adapted to rotate in a housing provided with a cylinder port at one end and exhaust and intake ports at the other end, the valve having a ported packing face square with the valve axis adjacent each end of the housing, substantially stationary ported packing plates in resilient contact with said faces and circular sealing members within the periphery of said plates and bearing against the housing concentric with the respective ports whereby the cylinder port is alternately connected through the valve with the intake and exhaust ports as the valve revolves, and means bearing against the housing to maintain the valve against movement away from the cylinder port.

9. In combination, a rotary valve adapted to rotate in a housing and having two transverse faces, two passages therethrough and ports in each face communicating with each passage, a housing having a cylinder port at one end and intake and exhaust ports at the other end, substantially stationary plates provided with communication means therethrough and in resilient contact with the two faces respectively, communication means separate from the plates and extending therethrough and in resilient contact with the respective faces of the valve and with the housing concentric with the respective housing ports whereby the cylinder port is connected through the passages of the valve alternately with the intake and the exhaust ports, as the valve revolves and said faces are covered at all times except through said communication means.

10. In combination, a rotary valve adapted to rotate in a housing and having two transverse faces, two passages therethrough and ports in each face communicating with each passage, a housing having a cylinder port at one end and intake and exhaust ports at the other end, substantially stationary plates provided with communication means therethrough and in resilient contact with the respective faces of the valve and with the housing concentric with the respective housing ports whereby the cylinder port is connected through the passages of the valve alternately with the intake and exhaust ports as the valve revolves and said faces are covered at all times except through said communication means, and means bearing against the housing to maintain the valve against movement away from the cylinder port.

11. In combination, a rotary valve having two transverse faces, a passage therethrough and a port in each face communicating with said passage, a housing having a cylinder port at one end and a manifold port at the other end, substantially stationary plates provided with communication means therethrough and in resilient contact with the two faces respectively, communication means separate from the plates and extending therethrough and in resilient contact with the respective faces of the valve and with the housing concentric with the respective ports, whereby the cylinder port will be connected through the valve to the manifold port for a predetermined period during each revolution of the valve, and the valve faces will be covered at all times except through said communication means.

12. In combination, a rotary valve adapted to rotate in a housing and having two transverse faces, a passage therethrough and a port in each face communicating with said passage, a housing having a cylinder port at one end and a manifold port at the other end, substantially stationary plates provided with communication means therethrough and in resilient contact with the two faces respectively, communication means separate from the plates and extending therethrough and in resilient contact with the respective faces of the valve and with the housing concentric with the respective housing ports, whereby the cylinder port will be connected through the valve to the manifold port for a predetermined period during each revolution of the valve, and the valve faces will be covered at all times except through said communication means, and means bearing against the housing to maintain the valve against movement away from the cylinder port.

13. In combination a rotary valve adapted to revolve in a housing and having two transverse faces, a passage therethrough and a port in each face communicating with said passage, a housing having at one end a cylinder port and at the other end a manifold port, substantially stationary plates in resilient contact with the two faces respectively, and communication means in resilient contact with the housing concentric with each housing port and acting with their respective plates to cover both faces of the valve at all times except through said communication means.

14. In combination, a rotary valve adapted to revolve in a housing and having two transverse faces, a passage therethrough and a port in each face communicating with said passage, a housing having at one end a cylinder port and at the other end a manifold port, substantially stationary plates in resilient contact with the two faces respectively, and communication means in resilient contact with the housing concentric with each housing port and acting with their respective plates to cover both faces of the valve at all times except through said communication means, and means bearing against the housing to maintain the valve against movement away from the cylinder port.

15. In combination, a rotary valve adapted to revolve in a housing and having two transverse faces, two passages therethrough and ports in each face communicating with each passage, a housing having a cylinder port at one end and intake and exhaust ports at the other end, substantially stationary plates in resilient contact with the two faces respectively, and communication means in resilient contact with the housing concentric with each port and acting with their respective plates to cover both faces of the valve at all times except through said communication means.

16. In combination, a rotary valve adapted to revolve in a housing and having two transverse faces, two passages therethrough and ports in each face communicating with each passage, a housing having a cylinder port at one end and intake and exhaust ports at the other end, substantially stationary plates in resilient contact with the two faces respectively, and communication means in resilient contact with the housing concentric with each port and acting with their respective plates to cover both faces of the valve at all times except through said communication means, and means bearing against the housing to maintain the valve against movement away from the cylinder port.

17. In combination, a rotary valve adapted to revolve in a housing and having two transverse ported packing faces and passage means therethrough, a housing having at one end cylinder communication means and at the other end manifold communication means, substantially stationary plates in resilient contact with the two faces respectively, and packing communication means in resilient contact with the housing concentric respectively with each housing communication means and acting with the respective plates to cover both faces of the valve at all times except through said packing communication means.

18. In combination, a rotary valve adapted to revolve in a housing and having two transverse faces, a passage therethrough and a port in each face communicating with said passage, a housing having at one end cylinder communication means and at the other end manifold communication means, substantially stationary plates in resilient contact with the two faces respectively, and packing communication means in resilient contact with the housing concentric respectively with each housing communication means and acting with the respective plates to cover both faces of the valve at all times except through said packing communication means.

19. In combination, a rotary valve adapted to revolve in a housing and having two transverse faces, two passages therethrough and ports in each face communicating with said passages, a housing having at one end cylinder communication means and at the other end manifold communication means, substantially stationary plates in resilient contact with the two faces respectively, and packing communication means in resilient contact with the housing concentric respectively with each housing communication means and acting with the respective plates to cover both faces of the valve at all times except through said packing communication means.

20. A rotary valve having ported transverse faces and adapted to rotate in a housing having ports co-acting with the ports of said valve faces, sealing means bearing against each transverse face, means forming communication with the co-acting housing ports, and thrust means separate from said sealing means opposing axial movement of the valve in the housing.

21. A rotary valve having ported transverse faces and adapted to rotate and be positioned in a housing having port means co-acting with the ports of said faces, the port means adjacent one valve face being cylinder port means and the port means adjacent the other valve face being manifold port means, sealing means bearing against each transverse face, and communication means in communication with the respective housing ports adjacent each valve face and acting with said sealing means to place the respective housing ports in communication with the adjacent valve face and to prevent communication with said face except through said housing ports.

22. In a rotary valve having transverse ported faces and adapted to rotate and be positioned in a housing having ports co-acting with said faces and having sealing means resiliently contacting and covering both of the valve faces and in communication with the respective housing ports adjacent each valve face, means for the circulation of oil through said housing whereby the valve may be cooled and lubricated.

23. In a rotary valve having transverse ported faces and adapted to rotate and be positioned in a housing having port means co-acting with said faces, the port means adjacent one valve face being cylinder port means, and the port means adjacent the other valve face being manifold port means, ported sealing means covering the valve faces and in communication with the respective housing port means adjacent each valve face.

24. In a rotary valve having transverse ported faces and adapted to rotate and be positioned in a housing having port means co-acting with said faces, the port means adjacent one valve face being cylinder port means and the port means adjacent the other valve face being manifold port means, ported sealing means covering the valve faces and communication means forming communication between the respective housing port means and valve faces.

25. In a rotary valve adapted to be positioned and to rotate in the presence of oil in a housing, a valve having transverse ported faces, a housing having port means co-acting with said faces, the port means adjacent one face of the valve being cylinder port means and the port means adjacent the other valve face being manifold port means, and sealing means covering the valve faces and having passage means in communication with the respective housing port means, whereby all of the valve ports are at all times covered except through said passage means.

26. A rotary valve adapted to revolve and be positioned in a ported housing and having two transverse ported packing faces co-operating with two end walls of the said housing, a ported housing having cylinder port means at one end and manifold port means at the other end, resiliently held non-revolvable packing plates bearing against the transverse faces of the valve and means connecting the valve ports to the co-acting housing port means upon each revolution of the valve.

27. A rotary valve adapted to revolve and be positioned in a ported housing and having two transverse ported faces co-operating with two ported end walls of the said housing, a ported housing having cylinder port means in one end wall and manifold port means in the other end wall, resiliently held non-revolvable packing plates bearing against the transverse faces of the valve, and sealing members connecting the valve ports in communication with the respective housing ports upon each revolution of the valve.

28. A rotary valve adapted to revolve and be positioned in a ported housing and having two transverse ported packing faces co-operating with two ported end walls of the said housing, a ported housing having cylinder port means in one end wall and manifold port means in the other end wall, and resiliently held, non-revolvable packing means covering and connecting each valve face with the respective housing ports as the valve revolves.

29. A rotary valve adapted to revolve and be positioned in a ported housing and having two transverse ported packing faces co-operating with two ported end walls of the said housing, a ported housing having cylinder port means in one end wall and manifold port means in the other end wall, and separate ported means of substantially the same diameter as and having resilient contact with each transverse face of the valve and including a circular apertured sealing member registering with an in substantially leak proof connection with each housing port and connecting with the co-acting valve port.

30. A rotary valve adapted to rotate and be positioned in a housing having two end walls and provided with a cylinder port in one end wall and a manifold port in the other end wall, the valve having a ported packing face square with the valve axis adjacent each port, substantially stationary sealing plates in contact with said faces and communication means within the periphery of said plates and adjacent the respective valve faces and in communication with the respective housing ports and registering with the respective valve ports whereby the valve may communicate with a cylinder through one of said plates and with a manifold through the other of said plates.

31. A rotary valve adapted to rotate in a housing provided with a cylinder port at one end and exhaust and intake ports at the other end, the valve having a ported packing face square with the valve axis adjacent each end of the housing, substantially stationary ported packing plates in contact with said faces and communication means within the periphery of said plates and in communication with the respective housing ports whereby the cylinder port is alternately connected through a single-ported plate with the valve and the valve connected through a double-ported plate with the intake and exhaust ports of the housing as the valve revolves.

32. In combination, a rotary valve adapted to revolve in a housing and having two transverse ported packing faces and passage means therethrough; a housing having at one end cylinder communication means and at the other end manifold communication means, substantially stationary plates in contact with the said two faces respectively, and intermediate communication means in communication with each of the housing communication means respectively and acting with the respective plates to cover both faces of the valve at all times except through said intermediate communication means, whereby communication may be established between the cylinder communication means and the valve through one plate and communication may be established between the valve and the manifold communication means through the other place.

33. In combination, a rotary valve adapted to revolve in a housing and having two transverse faces, a passage therethrough and a port in each face communicating with said passage, a housing having at one end cylinder communication means and at the other end manifold communication means, covering and sealing means in communication with said cylinder communication means and contacting the adjacent valve face to prevent cylinder pressure leakage along said face and covering and sealing means in communication with said manifold communication means and in contact with the adjacent valve face to prevent leakage of pressure along said face to or from said manifold communication means whereby both valve faces will be sealed and covered at all times except through said covering and sealing means.

34. In combination, a rotary valve adapted to revolve in a housing and having two transverse faces, two passages therethrough and ports in each face communicating with said passages, a housing having at one end cylinder communication means and at the other end manifold communication means, covering and sealing means in connection with said cylinder communication means and contacting the valve to prevent leakage along the adjacent valve face and covering and sealing means in connection with said manifold communication means and contacting the adjacent valve face to prevent leakage along said face.

35. A rotary valve having transverse ported faces and adapted to rotate and be positioned in a ported housing, resiliently held sealing members co-acting with the said faces, sealing means in part comprising said members, bearing against each transverse valve face and forming communication means with the co-acting housing ports and acting to place the respective housing ports in communication with the adjacent valve faces and to prevent communication between said housing ports except through said sealing means and said valve ports, the construction adjacent one valve face packing against cylinder pressure leakage along said face and adjacent the other valve face packing against pressure leaking to or from said communication means along said face.

36. A rotary valve for an engine adapted to rotate in a housing ported, in the direction of the rotational axis of the valve, at one end to the engine and at the other end to intake and exhaust manifolding, substantially stationary sealing plates resiliently held against the faces of said valve, resilient communication means limiting flow through the housing ports and sealing plates to predetermined periods, and valve porting through the transverse valve faces co-acting with the housing ports through intermediate communication means, the construction adjacent one valve face packing against leakage to or from the engine along said face and adjacent the other valve face packing against leakage to or from the said manifolding along the adjacent face of the valve.

37. A rotary valve having two transverse faces and adapted to rotate in a housing having in one end wall a port to an engine cylinder and in the other end wall an intake port and an exhaust port, the valve being provided with a passage registering with the cylinder port and with the exhaust port and a second passage registering with the cylinder port and the intake port, a plate resiliently held in contact with the valve face adjacent the cylinder port and having a single port with which the passages of the valve register and means combined with said plate to form a covering for said valve face and communication between its passages and the cylinder port, and a second plate resiliently contacting the other face of the valve and having ports registering with the valve passages and the intake and exhaust ports respectively, and means combined with the second plate to form a covering for the adjacent valve face and communication between its passages and the intake and exhaust ports respectively.

LUCIEN HALSEY BENSTER.
ROLLAND S. TROTT.